United States Patent
Stienhans

(10) Patent No.: US 8,914,347 B2
(45) Date of Patent: Dec. 16, 2014

(54) EXTENSIBLE SEARCH ENGINE

(75) Inventor: Frank Stienhans, Mannheim (DE)

(73) Assignee: SAP AG, Walldorf (DE)

( * ) Notice: Subject to any disclaimer, the term of this patent is extended or adjusted under 35 U.S.C. 154(b) by 1566 days.

(21) Appl. No.: 11/203,277

(22) Filed: Aug. 15, 2005

(65) Prior Publication Data

US 2007/0038604 A1 Feb. 15, 2007

(51) Int. Cl.
*G06F 7/00* (2006.01)
*G06F 17/30* (2006.01)

(52) U.S. Cl.
CPC ............................ *G06F 17/30864* (2013.01)
USPC .......................................... 707/706; 707/736

(58) Field of Classification Search
USPC .................................................. 707/706, 736
See application file for complete search history.

(56) References Cited

U.S. PATENT DOCUMENTS

| | | | |
|---|---|---|---|
| 6,434,548 B1 * | 8/2002 | Emens et al. ....................... 707/3 |
| 6,490,579 B1 | 12/2002 | Gao et al. |
| 6,789,077 B1 | 9/2004 | Slaughter et al. |
| 6,907,423 B2 | 6/2005 | Weil et al. |
| 7,168,051 B2 * | 1/2007 | Robinson et al. ............. 715/848 |
| 7,370,040 B1 * | 5/2008 | Kruy et al. ............................. 1/1 |
| 2002/0049756 A1 | 4/2002 | Chua et al. |
| 2002/0113820 A1 * | 8/2002 | Robinson et al. ............. 345/764 |
| 2003/0217045 A1 * | 11/2003 | Yao et al. .......................... 707/3 |
| 2004/0006609 A1 | 1/2004 | Skrepetos |
| 2004/0061720 A1 * | 4/2004 | Weber ............................ 345/760 |
| 2006/0026147 A1 * | 2/2006 | Cone et al. ........................ 707/3 |

FOREIGN PATENT DOCUMENTS

WO  WO 02/089382 A2  11/2002
WO  WO 03/054745 A1  7/2003

OTHER PUBLICATIONS

Extended European Search Report from the European Patent Office dated Oct. 18, 2006, for European Application No. 06015174.3-2201.

* cited by examiner

*Primary Examiner* — Robert Stevens
(74) *Attorney, Agent, or Firm* — Finnegan, Henderson, Farabow, Garrett & Dunner, LLP

(57) ABSTRACT

Methods and systems are disclosed for extending the search functionality of search engines. In one configuration, a method for modifying functionality of a search engine operated by a search engine host involves providing a search function associated with an entity different from the search engine entity and making that search function available to the search engine entity such that searches using the search engine utilize the search function.

8 Claims, 5 Drawing Sheets

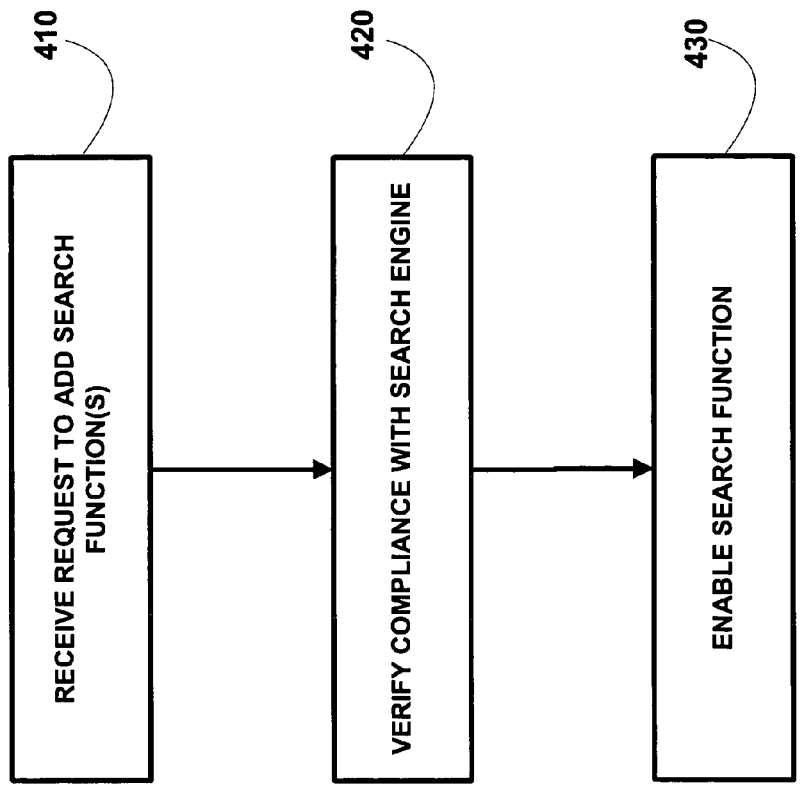

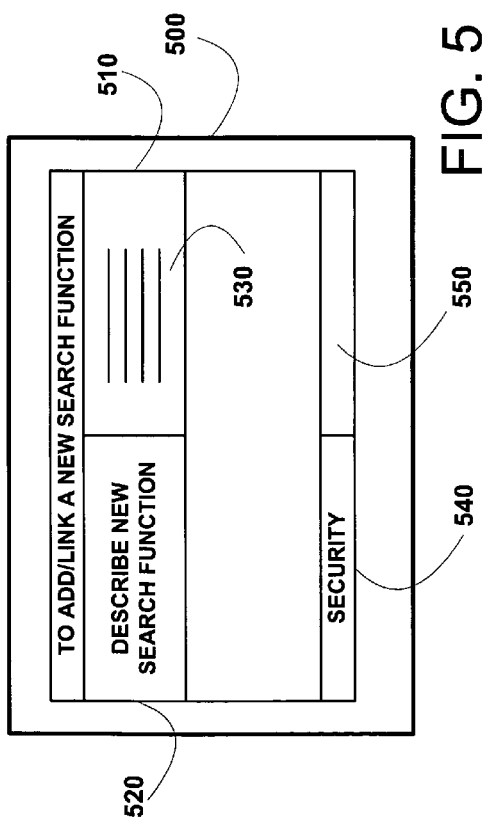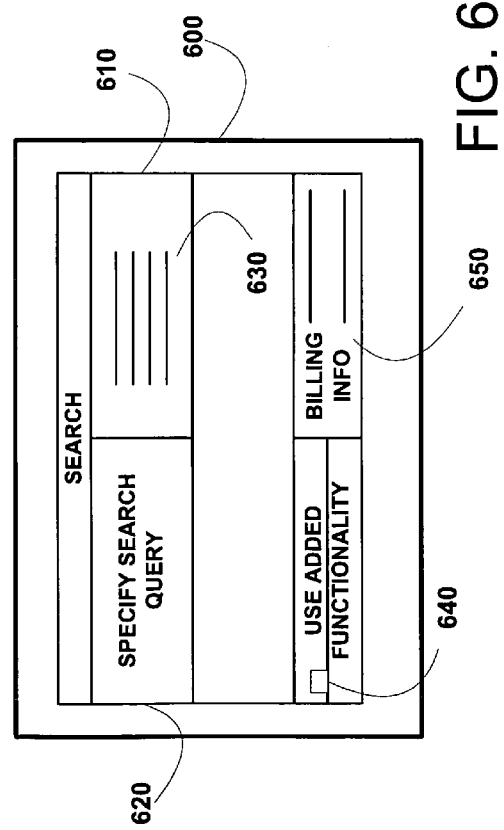

EXTENSIBLE SEARCH ENGINE

TECHNICAL FIELD

The present invention generally relates to information retrieval systems and, more particularly, to systems and methods for extending the functionality of information retrieval systems such as search engines.

BACKGROUND

With the development of the computer network, computer users now have access to vast amounts of data beyond that which may be stored on a floppy disk or a hard drive of a user's personal computer (PC). For example, small businesses now use Local Area Networks (LANs) to allow networked users to access data not only on their PCs but also on the PCs of other network users. Additionally, LANs provide network users with access to data on server computers that provide services to other computers and users on a network.

Internetworks may connect multiple LANs, thereby increasing the data available to users. Larger still are Wide Area Networks (WANs) and Metropolitan Area Networks (MANs), the latter of which is designed to cover large cities. The largest such network, commonly known as the Internet, has introduced vast amounts of information into the business place and home. The individual networks that make up the Internet include networks that may be served from sources such as commercial servers, university servers, research and other networks of computers, and military networks.

Dramatic growth in accessibility to data, however, was accompanied by a number of difficulties. For example, users on the Internet initially experienced logistical problems when searching and recovering information on a particular topic. Users had to know precisely where in the network to find sought-after information, access the server with that information, and use cryptic commands to recover the information.

The implementation of Hypertext Markup Language (HTML) increased the usability of the Internet or, more specifically, its subset called the World Wide Web, by enabling a user to navigate through documents (sometimes called "web pages") using software called "browsers" or "web browsers," such as, Navigator from Netscape Corp. and Internet Explorer from Microsoft Corp. A hypertext link appears as a word, phrase or image in a web page provided by a server. Using the browser software, a user is able to click on (and thereby select) a hypertext link and, in theory, be transferred to another information server, which may be remote from the server the provided the web page with the originating hypertext link. In actuality, however, the browser construes the selection of a link as a new request to retrieve data such as a web page from anoter server and uses an address associated with the link to access that server and complete the request. Through the use of many such hypertext links, sites with similar content can be cross-referenced, allowing a user access to supplemental information that is distributed across the Internet.

Information access on the Internet has been made even easier by numerous companies providing information search services such as Google and Yahoo, both of which provide "engines" to search the Internet. These companies provide users access to servers with an index of the contents of large numbers of web pages, either the page's full text or summaries. They allow users to interface with the index by enabling the users to input queries to the search engines and by providing users with the results. The results may include web pages with hypertext links that, when selected, enable the users to access the original indexed pages.

Search engines may be characterized as software, including computer executable instructions, that, when executed by a computer, allows a user to remotely perform searches on the Internet. The searches may cover any indexed data such as the titles of documents, Uniform Resource Locators (URLs), summaries, or full text. Usually, information service providers build indices, or databases, of web page contents through automated algorithms. These algorithms are commonly referred to as "Spyders." Generally, the results or "hits" of the search are presented to the user with hypertext links allowing the user to pick and choose the desired results and then transfer to a particular site associated with the selected search results in order to retrieve the desired information on the web pages therein.

A "metasearch" engine provides a user interface such as a web page with access to multiple search engines. The metasearch engine receives a user's search query, and parses and reformats the query. The resulting queries are then forwarded to the search engines with each search engine receiving a query in accordance with the format for that search engine. After retrieving the results from the individual search engines, the metasearch engine presents them to the user in another web page. These metasearch engines simplify searching by eliminating the need for users to formulate and submit individual queries to each of the search engines. Infospace, Inc. currently provides a metasearch engine known as "metacrawler." Metacrawler currently interfaces with the following search engines: "Google," "Yahoo," "Ask Jeeves," "About," "FindWhat," and "LookSmart."

Current metasearch engines therefore provide an interface to several search engines. They enable users to search a larger portion of the Internet through use of several search engine indices. Conventional metasearch engines, however, are limited by the functionality of the engines for which they provide an interface.

Although some search engines may from time to time extend their functionality, they do not do so by integrating their engines with search functionality provided by another, external source using an automated technique for extending search functionality of search engines. Similarly, although metacrawlers aggregate the functionality of multiple search engines, they do not do so by integrating their engines with search functionality provided by another, external source using an automated technique for extending search functionality of search engines.

SUMMARY

The present invention is directed to methods and systems for extending the functionality of search engines. In one aspect of the present invention, a method is disclosed for modifying functionality of a search engine operated by a search engine entity. The method may provide a search function associated with an entity different from the search engine entity. The method may also make the search function available to the search engine entity such that searches using the search engine utilize the search function.

In accordance with another aspect of the present invention, a method is disclosed for modifying functionality of a search engine. The method may include steps by which a search engine entity provides a search engine with core functionality, electronically receives a request from a search function proprietor to provide a search function, and facilitates use of the search function with the search engine.

In accordance with yet another aspect of the present invention, a method is disclosed for extending a set of search functionality of a search engine to include a new search functionality. In accordance with this method, a request is received for providing the new search functionality in association with the search engine. A determination is made, based on characteristics of the search engine that may vary from engine to engine, as to whether there are any compliance problems or concerns associated with including new search functionality in the set of search functionality of the search engine. Lastly, the new search functionality is made available to searchers based on a result of the determination. One way of making the new functionality available to searchers is by including a link to the new search functionality in the set of search functionality of the search engine, the link effecting communication with a server remote from the search engine that hosts the new search functionality.

In another aspect of the invention, a customizable search system is disclosed. The system may include a server having a search engine with core functionality, and an interface configured to facilitate communication between the search engine a new search function not included in the core functionality, wherein the new search function is hosted by a server located remote with respect to the server having the search engine.

In accordance with a further aspect of the invention, an extensible search engine system is disclosed. The system includes a first server hosting a library having a set of search functions, each function being capable of providing a type of search result in response to a query, and a receiver configured to receive a request to add a new search function to the library.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings, which are incorporated in and constitute a part of this specification, show certain aspects of the present invention and, together with the description, help explain some of the principles associated with the invention.

FIG. 4 is a flow chart of an exemplary search engine host process consistent with certain aspects related to the present invention;

FIG. 5 is an example of a user interface used by a search function provider to extend the search functionality hosted by a search engine host consistent with certain aspects related to the present invention; and FIG. 6 is an example of a user interface used by clients of a search engine host to interface with the search facilities of the host consistent with certain aspects related to the present invention.

DETAILED DESCRIPTION

Figure 1:
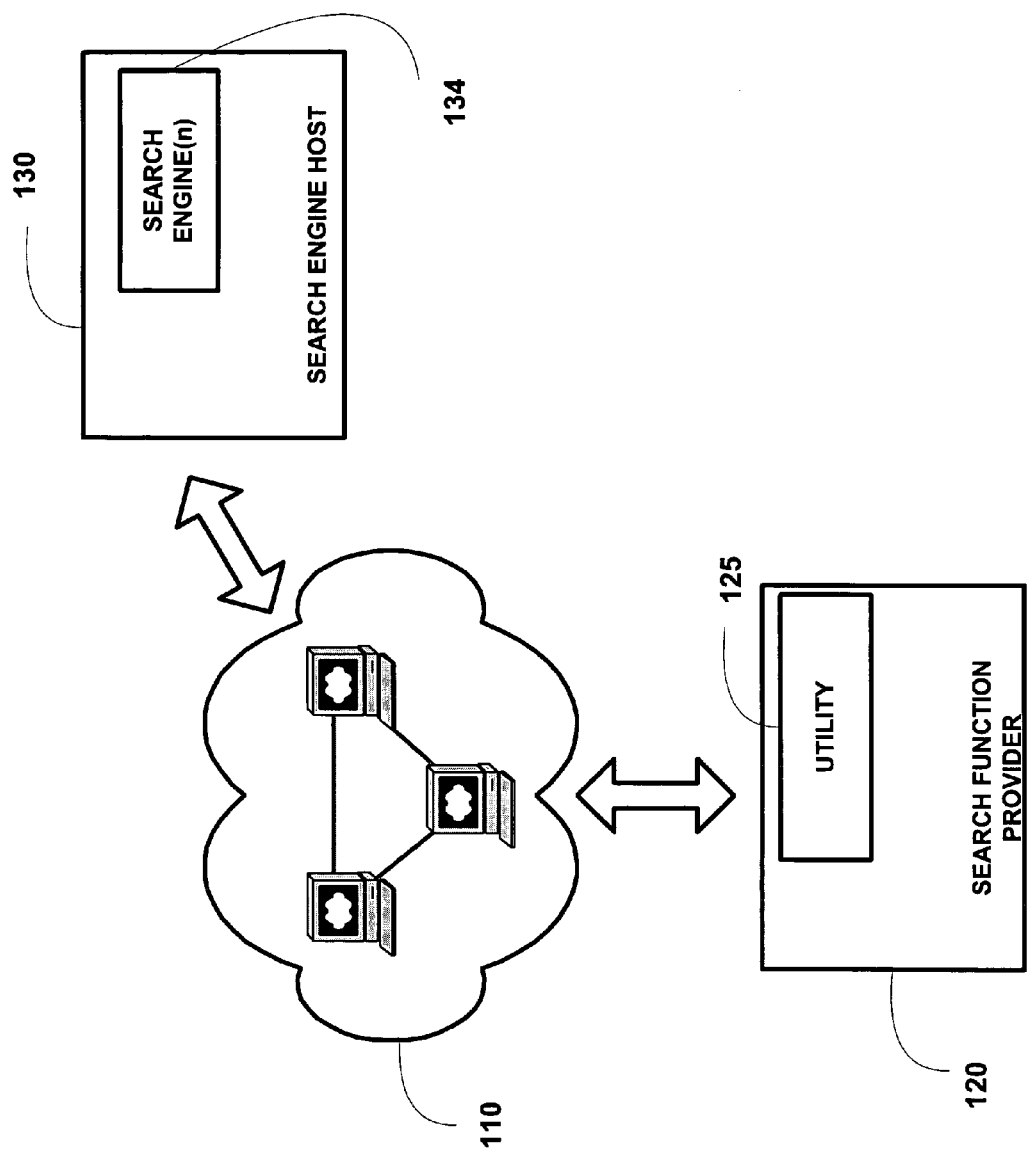
FIG. 1 illustrates a block diagram of one configuration of a system in which certain aspects related to the present invention may be implemented.

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with certain aspects related to the invention.

Methods and systems consistent with the present invention enable the extension of search engine functionality. Computers coupled to a network operate in accordance with a client-server architecture. Server computers generally provide services in response to requests from client computers. The specific configurations of the computers are not important to this description. Those skilled in the art are familiar with many different configurations of computers, including hardware and software, that may be used to implement features and functions consistent with the present invention, as described herein.

In one configuration consistent with the present invention, a search engine host operates one or more server computers and a search function provider operates one or more server computers. Program developers develop software, including program instructions, for execution by these computers. The software is configured to perform specific functions; many of these functions are common for search engines such as receiving requests from clients for searches, initiating the searches, and providing search results. Thus, both the provider and the host may respond to search requests from clients. Alternatively, the host responds to client requests and the provider is not configured to respond client requests.

In a configuration consistent with the present invention, the search function provider may also request to extend the search functionality of the search engine host. And the search engine host may enable providers to request to extend the search functionality of the host. Extension of search engine functionality can result from modifying existing functionality or adding new functionality.

For example, a search engine host may not currently be configured to search content configured in accordance with a specific format (for example, MP3 files). The search function provider, however, may have developed a new search capability (embodied in, for example, software) to support searching content configured in accordance with this format. The search function provider may be willing to provide this capability to others, for example, the host, and the search engine host may be interested in extending its functionality to include the new search function. In this case, the search function provider, acting as a client of the host, can use an interface configured in accordance with certain aspects of the present invention to add the new functionality to the host's set of functionality. Once added to the functionality of the host, the new functionality may be accessed by clients interfacing with the search engine host. The operation of the new functionality may occur on a server computer of the host or, in another configuration, on the server computer of the search function provider with the search engine host being a client of the provider in the latter configuration. In either case, clients of the host will be able to use the new functionality, and only the operating location of the new functionality is different. Accordingly, clients of the host will be able to search content configured in accordance with a format that was not previously supported by the host.

The foregoing discussion is intended to introduce and provide initial clarity for some of the aspects associated with the present invention. Further details of the above-mentioned functionality and additional aspects, features, and embodiments of the present invention are described below.

FIG. 1 illustrates a block diagram of one configuration of a system 100 in which certain aspects related to the present invention may be implemented. As shown, system 100 includes a network 110 connecting a search function provider 120 and a search engine host 130. Network 110 can be any communications network such as a LAN or WAN, or it can be the Internet. As explained, provider 120 and host 130 can each be formed of one or more server computers. Provider 120 has, in accordance with one aspect consistent with the present invention, developed a new search function. The new search function can enhance the user's search experience in a variety of ways including, for example, improved search quality, improved search speed, and improved presentation of search results. The new search function can also permit searches in new libraries of content. The new search function can permit searches of content configured in accordance with a specific format, such as a format that was previously thought to be unsearchable in that no one had determined how to effectively configure searches for files configured in this format or configured an engine to effectively search files configured in this format.

As shown, the new search function is embodied in the utility software 125. Provider 120 may permit clients to utilize this search function embodied in software 125 via direct access to a server of the provider 120 executing software 125. Alternatively, provider 120 does not offer direct client access to the function.

Search engine host 130 provides clients access to one or more search engines 134. Search engines 134 represent existing or core search functionality offered by host 130 and include software executed by servers of host 130 or by servers of one or more providers, such as provider 120, on behalf of host 130. The engines may also include indices to content being searched and/or libraries of content associated with the indices.

Servers may be configured to operate HTTP (HyperText Transfer Protocol) server software that facilitates responding to requests from clients on different networks such as intranets and the Internet. The servers may also have specially configured software to facilitate communication between the HTTP server software and the search engine software. For example, HTTP enables communication between client computers and server computers in accordance with the protocol. However, the particular protocol used for communication is not critical to implementation of systems and methods consistent with the present invention.

Using an interface, including request and response operations configured in accordance with certain aspects of the present invention, provider 120, which currently has and/or operates a search function embodied in utility software 125, seeks to modify search functionality of host 130, or host 130 seeks to modify its functionality to include that provided by utility software 125.

Figure 2:
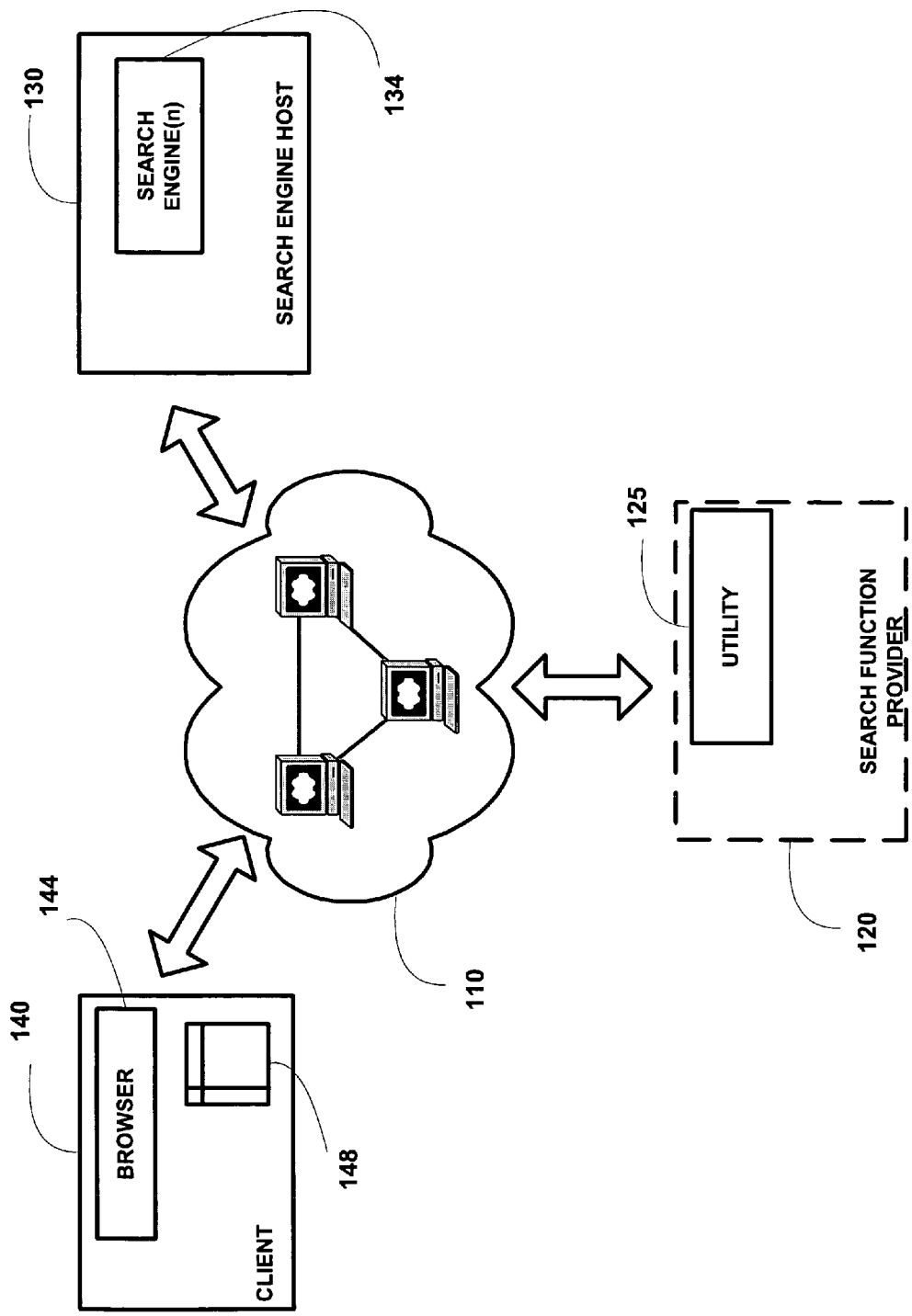
FIG. 2 illustrates a block diagram used to explain one configuration of a system in which certain aspects related to the present invention may be implemented.

FIG. 2 illustrates a block diagram used to explain one configuration of a system in which certain aspects related to the present invention may be implemented. In accordance with one aspect of the present invention, search engine host 130, using engines 134, responds to searches submitted by clients, such as client 140 shown in FIG. 2. Client 140 represents one or more computers configured to perform operations, including accessing servers, sending requests to servers, and receiving responses from servers. In one configuration, client 140 may use browser software 144 in cooperation with operating system software to facilitate these operations. Conventional browser software may be used for this purpose, such as Internet Explorer from Microsoft Corporation and Navigator from Netscape Corporation. These known browsers enable presentation, including display, of content configured in accordance with particular formats such as HTML (HyperText Markup Language). Another other suitable format for the presentation of content, however, may be used in systems and methods consistent with the present invention. Block 148 represents a user interface presented by browser software 144.

In other words, using browser 144, a user can operate client computer 140 to access a server, such as a server of host 130. Browser software 144 may present user interface 148 during this process with user interface 148 providing an input/output mechanism for the user. For example, the user inputs a request to access a server and browser 144, using known techniques, accesses the server and returns a result, such as a web page if the server is on the World Wide Web. The returned web page may include an interface (148) for entering a search request or query, if the accessed server is a search engine such as an engine of host 130. After a user inputs the query into the interface, browser 144 sends the query to the server, the server returns the results, and browser 144 presents the results in a web page.

As shown, search engine host 130 one or more search engines 134 operating on servers of host 130, as distinguished from engines operated on servers of third parties, i.e., entities other than host 130. The search engines may include utility software 125 provided by search function provider 120. However, search function provider 120 is shown using a box with a broken line to signify that, in another configuration, host 130 may not physically include the utility software 125; rather, when it is determined that a search request requires use of the functionality enabled by utility 125, host 130 communicates all or part of the request as needed to provider 120, and provider 120 performs the added search function and returns a result. The result may be returned to host 130 or directly to the requesting client computer based on the particular configuration.

Figure 3:
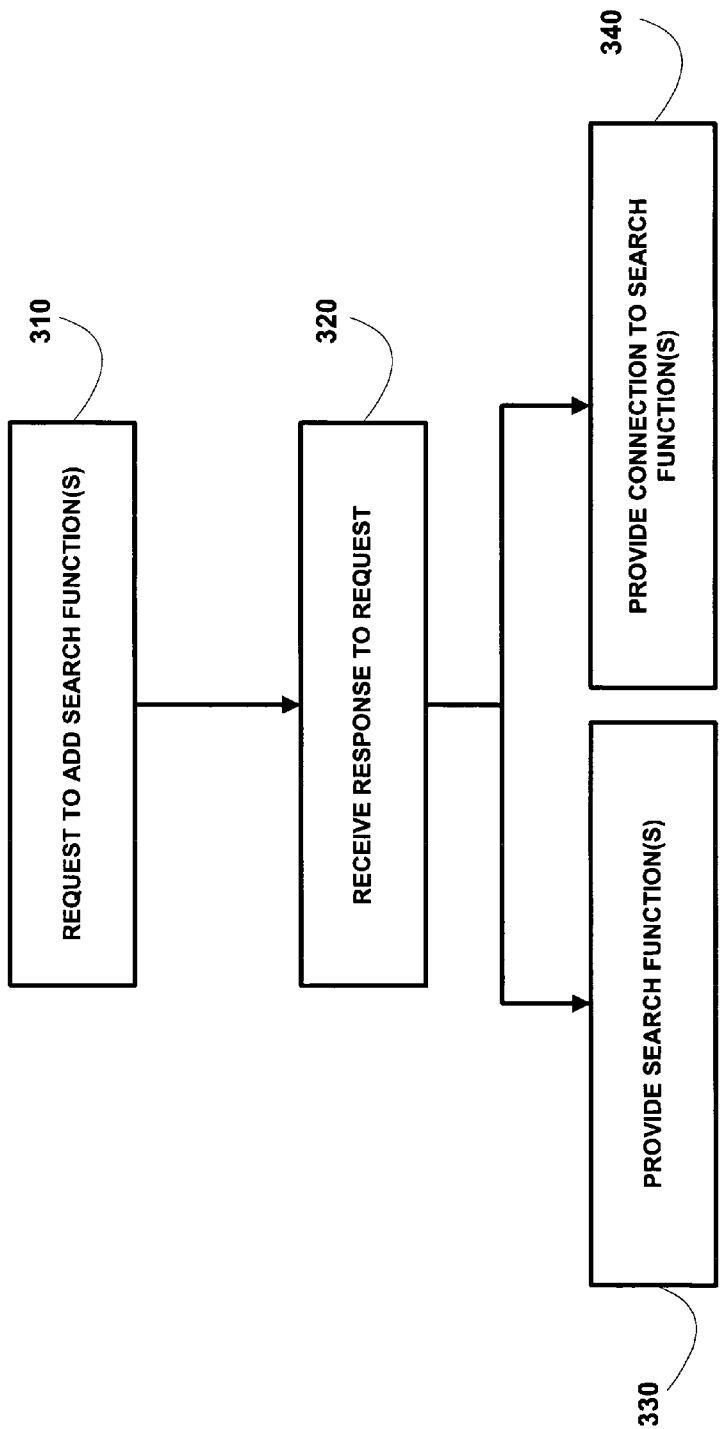
FIG. 3 is a flow chart of an exemplary search function provider process consistent with certain aspects related to the present invention.

FIG. 3 is a flow chart of an exemplary process for a search function provider consistent with certain aspects related to the present invention. In accordance with this process, a provider (such as provider 120) decides to add (or offer to modify) search functionality of a host (such as host 130) with, for example, new search functionality developed by the provider. As a first step, the provider sends a request to the host to add the new functionality (step 310) and receives a response from the host (step 320). For purposes of this description it is assumed that the host responds affirmatively. However, a negative response would result in termination of the process. Additionally, the particulars of the protocol for the request/response is not important; known protocols including HTTP can be used for this process. In a highly automated implementation, all steps of the process would be performed without user intervention once initiated.

After receiving the affirmative response from the host, the provider may either provide the new search functionality in the form of the utility software to the host (step 330) or provide the host with an interface or linked connection to the provider's search functionality (step 340). The interface enables the host to communicate in real time with the provider's utility software so that the host can offer the new functionality to its client computers upon request. The host may offer this option (step 340) or require the provider to provide the new search functionality in the form of the utility software to the host. Alternatively, the decision to use one of the options for extending search host capabilities may be determined after negotiation between the host and the provider. The particulars of the negotiation are not important, although those skilled in the art will appreciate that a linked connection enables the provider to maintain better control (such as security) over the new functionality. The linked connection also facilities better accounting procedures for the provider, should the provider opt to charge clients either directly or via the host a fee for searches. Clients may arrange payment methods in advance of searching or use a pay-for-search option (described below).

FIG. 4 is a flow chart of an exemplary search engine host process consistent with certain aspects related to the present invention. As a corollary to the process of FIG. 3, a host may facilitate extension of the host's search engine capabilities through the addition of new functionality, including new engine, functions, etc., as described above. As a first step 410, the host receives a request from a provider to provide a new function. The request may include one or more communications between the host and the provider. For security reasons, for example, the host may require would-be providers to log in using a user name and password. After successfully logging in, the provider may select an option offered by the host that enables the provider to request to add new functionality for the host.

The host may reject an offer to add functionality for a variety of reasons. For example, the host may determine that the functionality that the provider has offered is simply not needed by the host's client base. The host may also determine that the provider's new function is incompatible with existing functionality and search engines of the host. Moreover, the host may set specific compliance requirements for all new functionality from providers. In step 420, the host determines whether the provider's functionality meets these requirements. This step can be done using a fully automated process or one that involves human testing. Following successful completion of the compliance testing (step 420) if utilized, the host may enable the new function, as explained, offering the functionality to clients directly or through a linked connection to the provider.

FIG. 5 is an example of a user interface used by a search function provider to extend the search functionality hosted by a search engine host consistent with certain aspects related to the present invention. Display 500 has a window 510 divided into areas 520-550. Display 500 is, for example, the display screen of a computer, window 510 is, for example, an interface generated by the computer and through which a user can input data and view responses. The interface may, in one configuration consistent with the present invention, be a web page or a document configured using HTML. Each of the areas can be understood as windows within a window. Window 510 represents the interface used when a provider-client (such as provider 120) seeks to add functionality to a host (such as host 130). In area 530, an administrator associated with the provider describes the new search functionality, as indicated by area 520. The new functionality may be embodied in software transferred by the provider to the host with the request. Alternatively, the provider may enable the host to access the provider's functionality in accordance with the linked connection methodology discussed above. Also, the provider may specify in area 550 a security feature associated with the function (as indicated by the reference in area 540). The security feature represents, for example, an agreed secret for communications between the provider and the host. This would enable the provider to control access to the new functionality when it resides on a secure server of the provider and the provider permits the host to access that server. Alternative uses for a security feature would be obvious to those skill in the art. For example, if the host uses a linked connection configuration when offering the new functionality to clients, the host may use this security feature from the provider to enable secure communication between the host as a client of the provider.

FIG. 6 is an example of a user interface used by clients of a search engine host to interface with the search facilities of the host consistent with certain aspects related to the present invention. Clients such as client computer 140 may access hosts such as host 130 to use the services of the servers operated by the hosts. Such services may include, as explained above, functionality supported by search engines. As shown, the display 600 includes window 610. Window 610 is in turn divided into a number of areas 620-650. Area 620 is a message area specifying area 630 is for user input of a search query. Area 640 is for the user to select use of the added functionality of a provider that is offered by a host. In other words, in some configurations, a search engine host may provide users accessing the host's search engine(s) with access to additional functionality provided by a provider at a user's option. And if selected, the host may charge the user making the selection a fee to use the additional search functionality. Area 650 is for the users to input account information or other billing information such as a credit card for charging the user for this additional search facility. Those skilled in the art will appreciate that secure connection between a client computer and the host would be preferred when transmitting such user-sensitive information as credit card numbers, and that existing facilities such as HTTPS may be used to enable such secure communications.

Conclusion

Systems and methods consistent with the present invention enable full-function extensible search engines. The functionality of search engines can be easily extended to include search functionality of different search function service providers upon request.

The above described user interfaces are exemplary and are not intended to be limiting. For purposes of explanation only, certain aspects of the present invention are described herein with reference to the components illustrated in the figures. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of steps shown in or described in connection with the figures are exemplary and not intended to be limiting. Thus, other method steps may be used, and even with the methods depicted in the figures the particular order of events may vary without departing from the scope of the present invention. Moreover, certain steps may not be present and additional steps may be implemented. Also, the processes described herein are not inherently related to any particular apparatus and may be implemented by any suitable combination of components.

In one alternative, a search function provider may offer new/different search functionality to search engine hosts using an auction based mechanism where the host with the best bid wins.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A computer-implemented method for modifying functionality of a search engine operated on a first server, the first server being operated by a search engine host, comprising:
   automatically modifying the functionality of the search engine with a new search function provided by a search function provider, the search function provider operating a second server located remotely from the first server and a user of the search engine, wherein the new search function permits the search engine to search content having an electronic file format that the search engine was previously unable to search; and
   making the new search function available to the search engine host by operating the new search function on one of the first server and the second server such that searches using the search engine utilize the new search function.

2. A computer-implemented method for modifying functionality of a search engine, comprising:
   receiving a request at a search engine host from a search function proprietor to provide a new search function, wherein the search engine host includes a first server, the first server having the search engine operating thereon, and the search function proprietor includes a second server, the search function proprietor being located remotely from the first server and a user of the search engine;
   automatically modifying the functionality of the search engine with the new search function provided by the search function proprietor, wherein the new search function permits the search engine to search content having an electronic file format that the search engine was previously unable to search; and
   facilitating use of the new search function with the search engine by operating the new search function on one of the first server and the second server.

3. The computer-implemented method of claim 2, wherein the search function proprietor acts as a client of the search engine host to provide the new search function.

4. A customizable search system comprising:
   a first server hosting a search engine with core functionality; and
   an interface configured to facilitate communication between the first server and a second server hosting a new search function not included in the core functionality, wherein the second server is located remotely from the first server and the new search function permits the search engine to search content having an electronic file format that the search engine was previously unable to search.

5. An extensible search system comprising:
   a first server hosting a library having a set of search functionality of a search engine, wherein each functionality provides a type of search result in response to a query; and
   a receiver configured to receive a request to add a new search functionality to the library from a second server hosting the new search functionality, wherein the new search functionality permits the search engine to search content having an electronic file format that the search engine was previously unable to search.

6. A computer-implemented method for extending a set of search functionality of a search engine to include a new search functionality provided by a search function provider, wherein the search engine operates on a first server, the first server being operated by a search engine host, and wherein the search function provider operates a second server located remotely from the first server and a user of the search engine, comprising:
   receiving a request from the search function provider to provide the new search functionality in the set of search functionality of the search engine;
   determining, as a function of characteristics of the search engine, any compliance problems associated with including the new search functionality in the set of search functionality of the search engine;
   automatically modifying the set of functionality of the search engine based on the determination, wherein the new search functionality permits the search engine to search content having an electronic file format that the search engine was previously unable to search; and
   making the new search functionality available to searchers accessing the search engine based on the determination by operating the new search functionality on one of the first server and the second server.

7. The computer-implemented method of claim 6, wherein operating the new search functionality on the first server comprises:
   including the new search functionality in the set of search functionality of the search engine.

8. The computer-implemented method of claim 6, wherein operating the new search functionality on the second server comprises:
   including a link to the new search functionality in the set of search functionality of the search engine, the link effecting communication with the second server, wherein the second server hosts the new search functionality of the search engine.

* * * * *